United States Patent
Sack et al.

(10) Patent No.: US 10,255,359 B2
(45) Date of Patent: Apr. 9, 2019

(54) REJECTED ARTICLE TRACKER

(71) Applicant: HighWire Press, Inc., Redwood City, CA (US)

(72) Inventors: John Sack, Palo Alto, CA (US); Abhinav Mittal, Palo Alto, CA (US); Sunil Mehta, Mountain View, CA (US); John Martin, Sunnyvale, CA (US)

(73) Assignee: HighWire Press, Inc., Los Gatos, CA (US)

( * ) Notice: Subject to any disclaimer, the term of this patent is extended or adjusted under 35 U.S.C. 154(b) by 163 days.

(21) Appl. No.: 15/336,694

(22) Filed: Oct. 27, 2016

(65) Prior Publication Data

US 2018/0121537 A1 May 3, 2018

(51) Int. Cl.
*G06F 17/30* (2006.01)

(52) U.S. Cl.
CPC .. *G06F 17/30722* (2013.01); *G06F 17/30542* (2013.01); *G06F 17/30684* (2013.01)

(58) Field of Classification Search
CPC ......... G06F 17/30684; G06F 17/30542; G06F 17/30722
USPC .......................................................... 707/728
See application file for complete search history.

(56) References Cited

U.S. PATENT DOCUMENTS

| 7,953,724 B2 * | 5/2011 | Griffith | G06F 17/30728 707/708 |
| 8,108,373 B2 * | 1/2012 | Petri | G06F 17/3089 707/705 |
| 8,392,429 B1 * | 3/2013 | Clancy | G06F 17/30864 707/738 |
| 8,676,780 B2 * | 3/2014 | Rollins | G06F 17/2745 707/708 |

(Continued)

OTHER PUBLICATIONS

Beel, Joeran, et al., "Academic search engine optimization (ASEO)", Journal of Scholarly Publishing, vol. 41, No. 2, Jan. 2010, 8 pages.*

(Continued)

*Primary Examiner* — Robert Stevens
(74) *Attorney, Agent, or Firm* — Van Pelt, Yi & James LLP

(57) ABSTRACT

Metadata is stored, wherein the metadata is associated with a pre-publication draft of the item of authored content, the metadata including a draft title and a pre-publication set of one or more authors. It is determined that no result in a first set of search results received from a repository of publication information in response to a first query based on the draft title satisfies one or more match criteria to be considered a match to the pre-publication draft of the item of authored content. In response to said determination, a second query based on the draft title and the pre-publication set of one or more authors is formulated and submitted to the repository. A second set of search results is received in response to the second query, each search result being associated with an associated published item of authored (Continued)

content, each published item of authored content having associated therewith a title as published and a list of authors as published. The one or more match criteria is applied to at least a subset of results included in the second set of search results to each of the title as published and the list of authors as published to determine a result considered to be a match to the pre-publication draft.

22 Claims, 7 Drawing Sheets

(56) References Cited

U.S. PATENT DOCUMENTS

| | | | | |
|---|---|---|---|---|
| 8,805,814 | B2 * | 8/2014 | Zijlstra | G06F 17/30646 |
| | | | | 707/707 |
| 2008/0306928 | A1 * | 12/2008 | Brunner | G06F 17/30997 |
| 2008/0320579 | A1 * | 12/2008 | Rollins | G06F 17/24 |
| | | | | 726/10 |
| 2009/0157667 | A1 * | 6/2009 | Brougher | G06Q 10/063 |
| 2014/0006424 | A1 * | 1/2014 | Al-Kofahi | G06F 17/30 |
| | | | | 707/754 |
| 2014/0095969 | A1 * | 4/2014 | Shneider | G06Q 10/06 |
| | | | | 715/224 |
| 2015/0205869 | A1 * | 7/2015 | Green | G06F 17/30864 |
| | | | | 707/726 |
| 2017/0004198 | A1 * | 1/2017 | Zholudev | G06F 17/30598 |
| 2017/0220652 | A1 * | 8/2017 | Kazi | G06F 17/30554 |

OTHER PUBLICATIONS

Onodera, Natsua, et al., "A Method for Eliminating Articles by Homonymous Authors From the Large Number of Articles Retrieved by Author Search", Journal of the American Society for Information Science and Technology, vol. 62, No. 4, © 2011, pp. 677-690.*

* cited by examiner

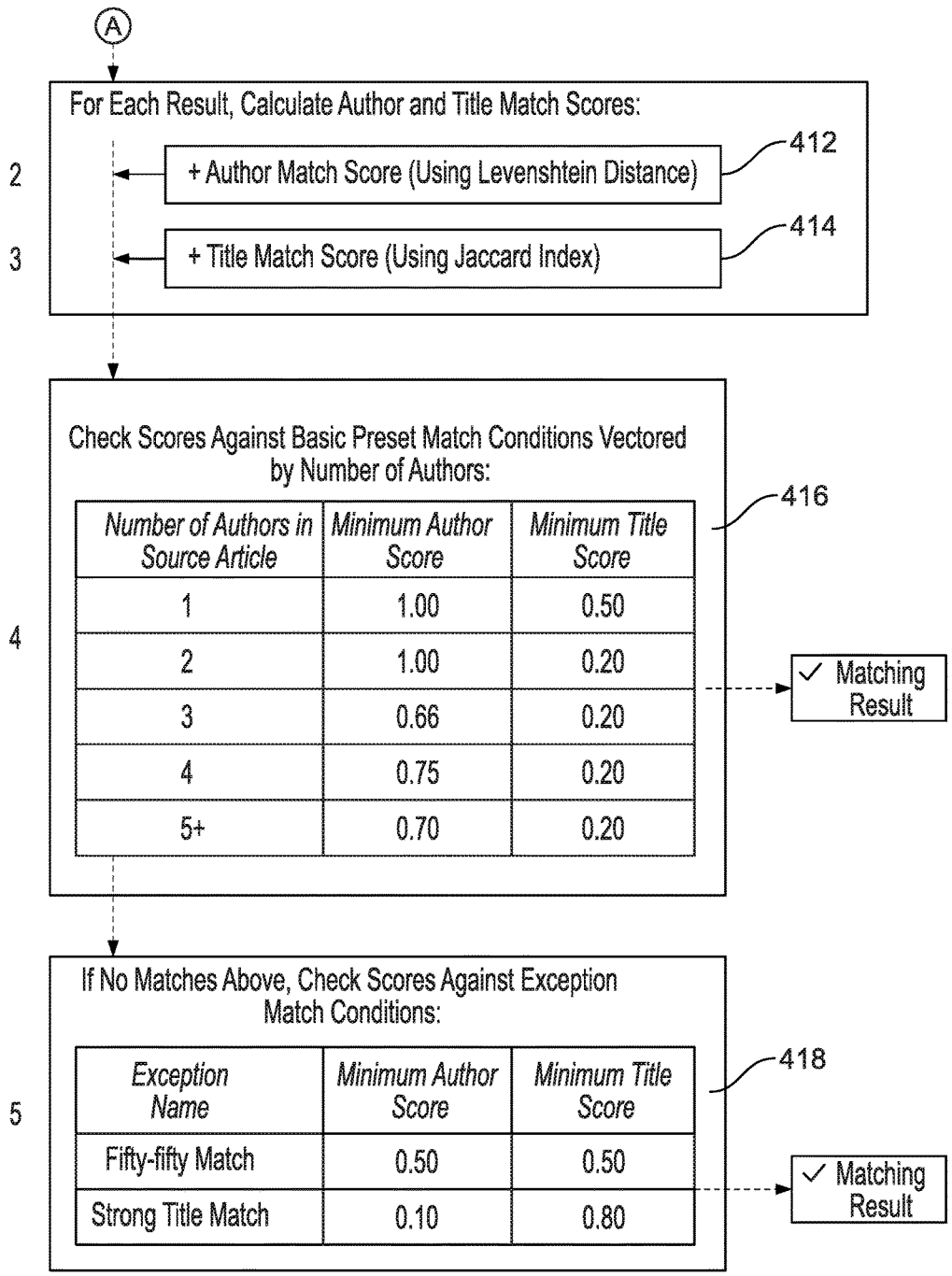
FIG. 4(Cont..)

REJECTED ARTICLE TRACKER

BACKGROUND OF THE INVENTION

Academic and/or research communities use items of authored content that have undergone editorial review, for example: journal papers, conference papers, magazine articles, seminar papers, research papers, technical papers, thesis, articles, dissertations, and book excerpts including book chapters, and/or research thesis. Editorial review may include peer review, publisher review, and/or professional review.

Upon submission of a new draft item of authored content to an editorial review, the editors may accept the draft for publishing, suggest revisions to the draft for publishing, or reject the draft for publishing in association with a publication related to the editorial review. If an item of authored content has been rejected, often the one or more authors will revise their item of authored content and submit it to another editorial review associated with a different publication. This may continue many times before the item of authored content is published, and the lifecycle of an item of authored content prior to publishing may contain information valuable to both publishers and authors.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A rejected article tracker is disclosed. Throughout this specification, an article and/or manuscript refers to any item of authored content including journal papers, conference papers, magazine articles, seminar papers, research papers, manuscripts, technical papers, thesis, articles, dissertations, and book excerpts including book chapters, and/or research thesis. In one embodiment, the rejected article tracker, given a draft item of authored content that was submitted to a publisher who rejected the draft, will automatically identify where the draft item of authored content was eventually published. The publisher who rejected the draft item of authored content may find this information valuable.

Figure 1:
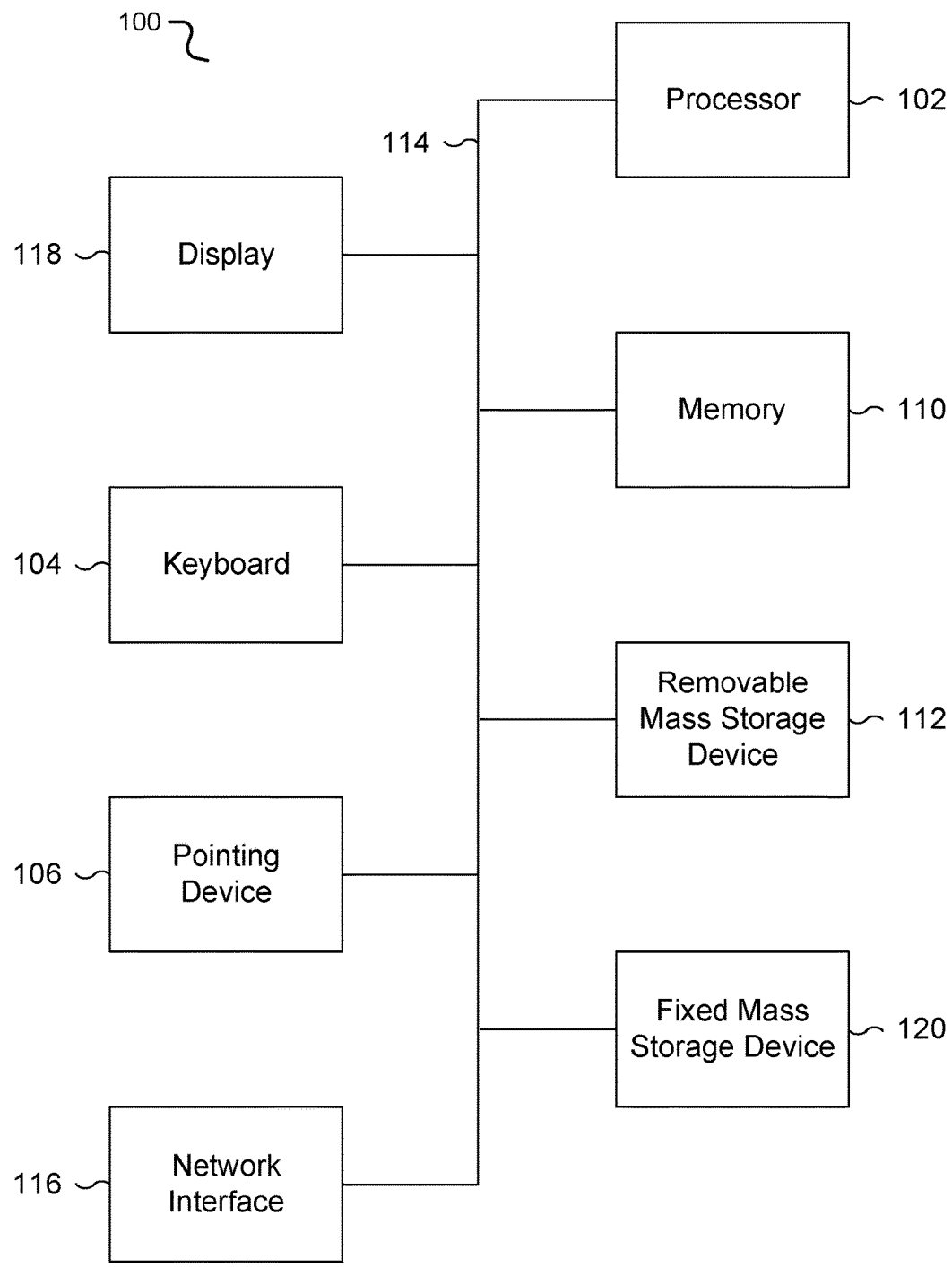
FIG. 1 is a functional diagram illustrating a programmed computer system/server for a rejected article tracker in accordance with some embodiments.

FIG. 1 is a functional diagram illustrating a programmed computer system/server for a rejected article tracker in accordance with some embodiments. As shown, FIG. 1 provides a functional diagram of a general purpose computer system programmed to provide intelligent data retrieval services in accordance with some embodiments. As will be apparent, other computer system architectures and configurations can be used for intelligent data retrieval services.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118. Examples of GPUs include modern graphics card adapters capable of general-purpose computing on graphics processing units ("GPGPU"), for example adapters implementing OpenCL, OpenACC, OpenHMPP, CUDA, DirectCompute, PhysX, and Stream.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard-disk drive. In one embodiment, mass storage 120 is a solid-state drive connected by a PCIe bus 114 with an FPGA controller. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
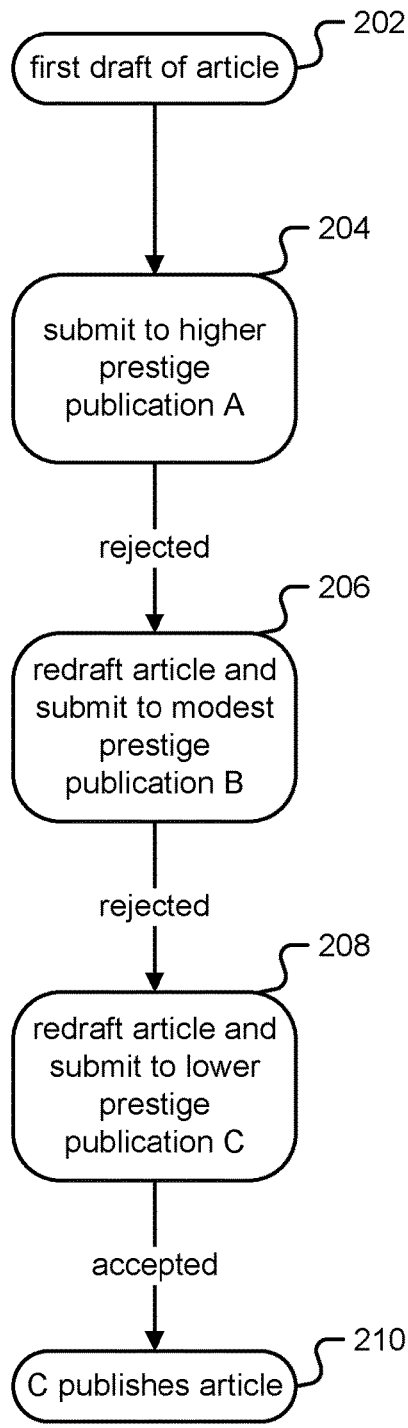
FIG. 2 is an illustration of the lifecycle of a typical item of authored content submission.

FIG. 2 is an illustration of the lifecycle of a typical item of authored content submission. Throughout this specification, editorial review includes peer review, publisher review, and/or professional review.

In (202), one or more authors complete a first draft of an item of authored content and prepare it for submission. In the example shown in FIG. 2, the author(s) may be personally or professionally incentivized to submit the first draft to a higher prestige publication such as that associated with a publisher denoted in FIG. 2 as "Publisher A", and thus the author(s) submit the first draft to Publisher A in (204). Without loss of generality, the techniques disclosed herein apply regardless to the order of publishers the author(s) submits the item of authored content to, and for any level of prestige for a publication, and the order of Publisher A, Publisher B, and Publisher C shown in FIG. 2 is merely an example.

Upon submission of a new draft item of authored content to an editorial review, the editors may accept the draft for publishing, suggest revisions to the draft for publishing, or reject the draft for publishing in association with a publication related to the editorial review. In the example shown in FIG. 2, Publisher A rejects the item of authored content and the author(s) redraft the item of authored content and submit to Publisher B of modest prestige in (206). As with Publisher A, in this example the item of authored content is also rejected by Publisher B, and thus the author(s) redraft the item of authored content and submit to Publisher C of lower prestige in (208). Publisher C accepts the item of authored content and/or goes through editorial review to get the item of authored content to meet its publishing standards, and Publisher C publishes the item of authored content in (210).

Figure 3:
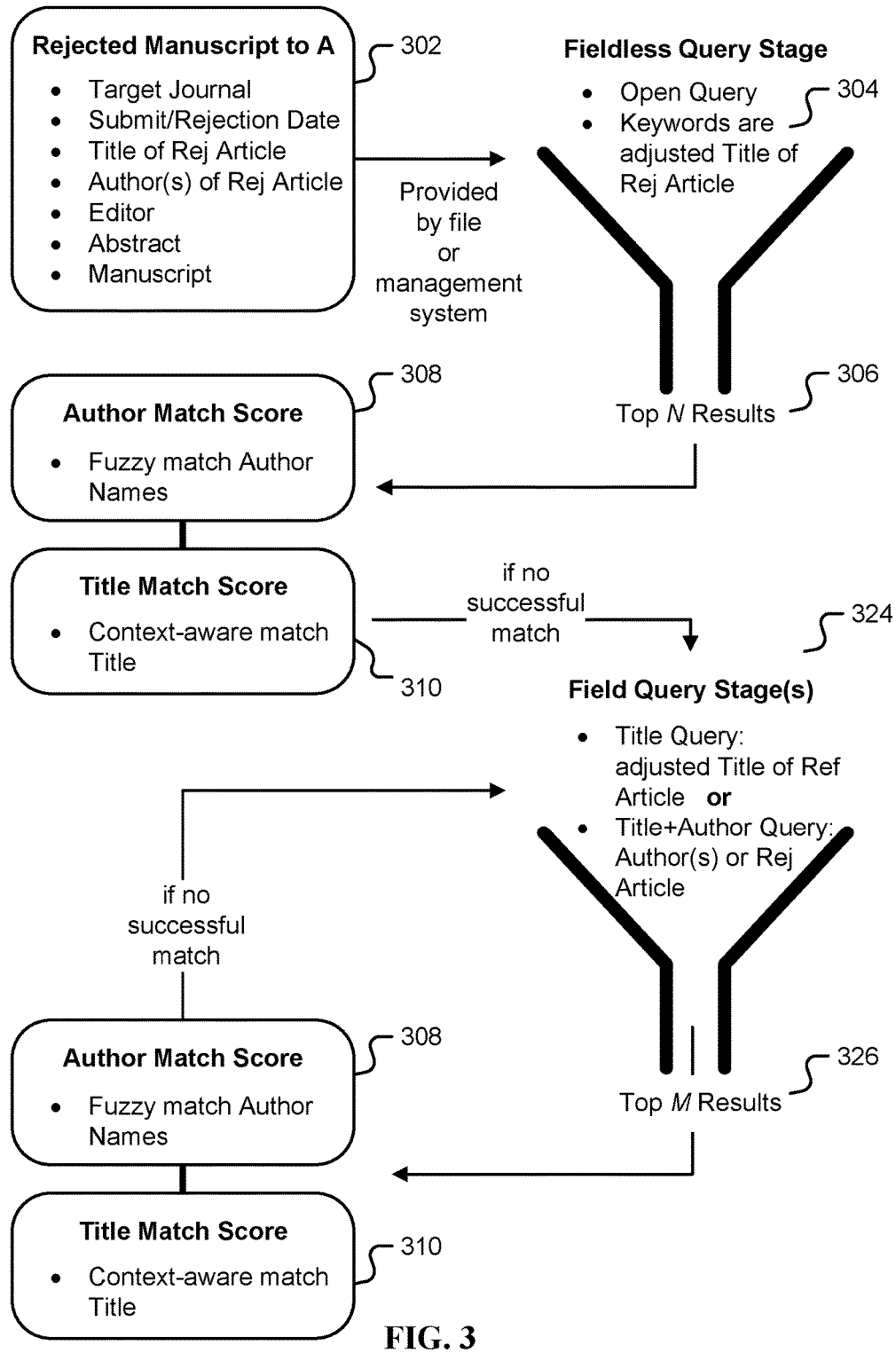
FIG. 3 is an illustration of a general staged query to identify a published version of an item of authored content.

FIG. 3 is an illustration of a general staged query to identify a published version of an item of authored content. In one embodiment, the query is generated by a rejected article tracker of FIG. 1.

A user submits (302) metadata associated with the item of authored content rejected by publication A in step (204) of FIG. 2. The metadata includes one or more of the following: the name of the target journal (publication A); submission and/or rejection date; title of the rejected item of authored content; author(s) of the rejected item of authored content; the editor who rejected the item of authored content; the abstract of the rejected item of authored content; and the body text of the rejected item of authored content. The user may submit the metadata either using a file or a management system, for example HighWire BenchPress.

The metadata (302) is used to form an open query (304) to a database of items of authored content, for example in one embodiment with databases associated with the Crossref Digital Object Identifier (DOI) registration agency interlinking items of authored content such as books, journal papers, conference papers, working papers, technical reports, data sets, and so forth. Throughout this specification, an "open query" refers to a generic database query that searches keywords in a given database without regard to fields such as Title, Author First Name, Author Last Name, and so forth. The rejection date (302) may be used to filter results, for example filtering out any items of authored content that pre-date the rejection date. The open query returns a number N of potentially matching published items of authored content (306), for example N=30, in the form of item of authored content metadata, as above.

For each of the N results from step (306), an author match score (308) and a title match score (310) is computed. An author match score (308) is a quantitative score based at least in part on a fuzzy match between author names from one of the results (306) with that of the rejected item of authored content (302). In one embodiment, the fuzzy match is based at least in part on a Levenshtein distance. In one embodiment, the fuzzy match threshold takes into account similarity or differences in the fields of study or other aspects of the publications being compared; for example setting the threshold higher in the event that a field of study associated with the target journal is different from that of the journal associated with the result. In one embodiment, the fuzzy match takes into account the order of authorship, for example who is identified as one of the first authors and/or who is identified as one of the last authors, and weights the fuzzy match according to authorship order for the target journal and/or the journal associated with the result.

A title match score (310) is a quantitative score based at least in part on a context-aware match between one of the results (306) with that of the rejected item of authored content (302). In one embodiment, the context-aware match is based at least in part on a Jaccard similarity coefficient. Other steps in the context-aware match may include lemmatization, tokenization and/or stripping of stop words, wherein throughout this specification "stop words" refer to low-information grammatical or auxiliary words, for example one or more of the following: a, an, and, are, as, at, be, but, by, for, if, in, into, is, it, no, not, of, on, or, such, that, the, their, then, there, these, they, this, to, was, will, and with. The author match score (308) and title match score (310) are used separate or in combination to declare if one or more successful matches are found in the results (306).

In one embodiment, if no successful match is produced based on the author match score (308) and title match score (310), a field query stage (324) is used next. In an alternate embodiment, even in the event one or more successful matches are produced, a field query stage is used next regardless. In general, a field query is more restrictive than an open query.

A field query stage (324) uses the item of authored content metadata (302) to form a field-based query (324) to the database of items of authored content used in query (304). In one embodiment, the first field query used is a title field query by searching the rejected item of authored content name (302) in the title field. The rejection date (302) may be used to filter results, for example filtering out any items of authored content that pre-date the rejection date. The open query results in a number M of potentially matching published items of authored content (326), for example M=30. A similar process using the author match score (308) and title match score (310) across the M results (326) is used to determine successful matches.

In one embodiment, if with the first field query stage no successful match is produced based on the author match score (308) and title match score (310), a second field query stage (324) is used next. In an alternate embodiment, even in the event one or more successful matches are produced, a second field query stage is used next regardless. The same process of steps (324), (326), (308), and (310) is repeated with a second field query, for example a conjunction of a title query and author query, wherein the query includes a title field query by searching the rejected item of authored content name (302) in the title field and an author field query by searching the list of author names and/or surnames (302) of the rejected item of authored content. In one embodiment, the second field query is more restrictive than the first field query. This process may be repeated with a third field query, a fourth field query, and so on, and in one embodiment each subsequent field query is equally or more restrictive.

In one embodiment, a second field query stage (324) includes an abstract field query by searching the abstract using a context-aware match similar to that used for a title field search, including lemmatization, tokenization and/or stripping of stop words. This second field query stage (324) may include, an abstract-only query, a title query and abstract query, an author query and abstract query, or a "title query plus author query plus abstract query".

Figure 4:
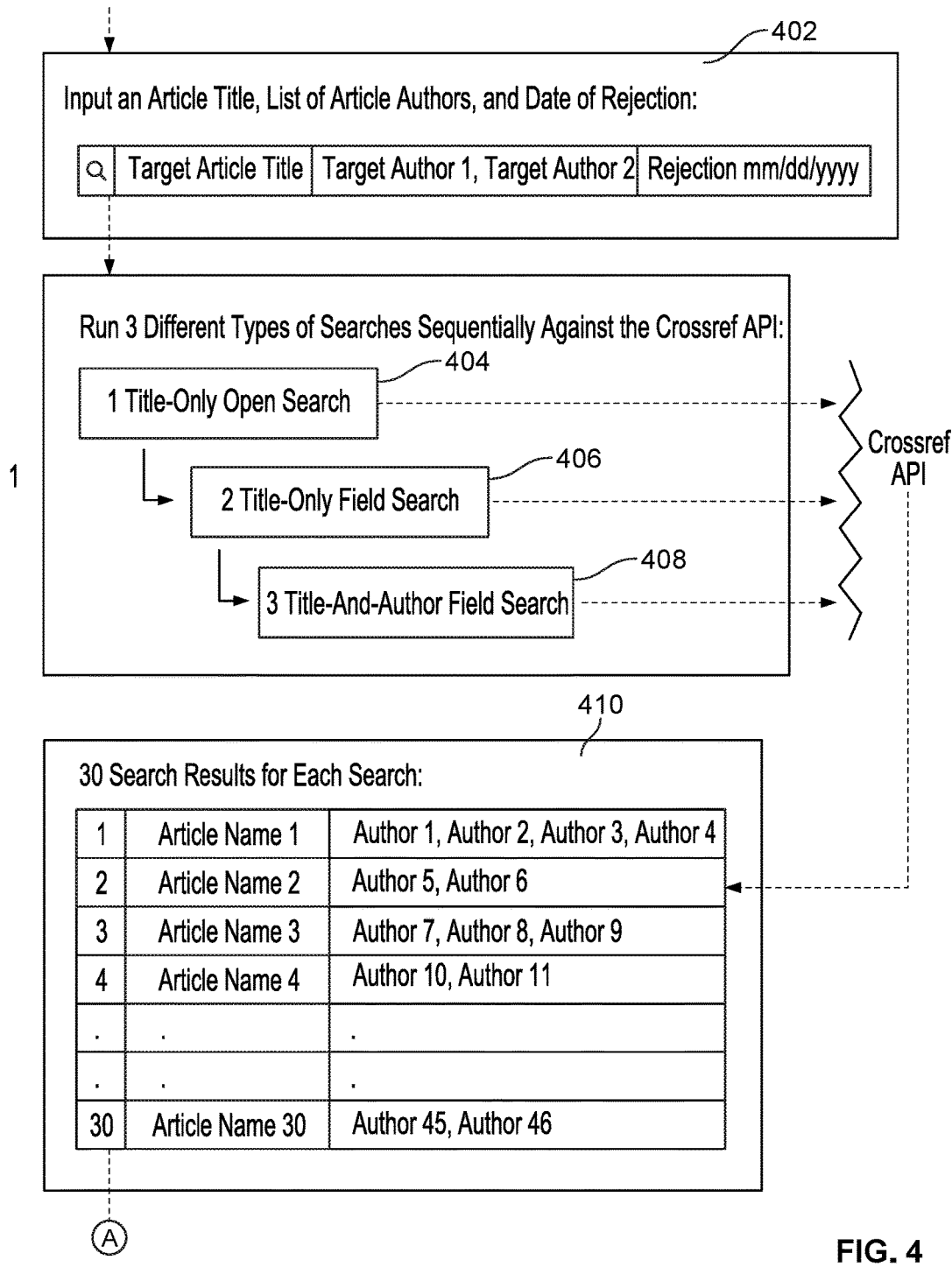
FIG. 4 is an embodiment of a three-staged query to identify a published version of an item of authored content.

FIG. 4 is an embodiment of a three-staged query to identify a published version of an item of authored content. The three-staged query of FIG. 4 is an example of the general staged query approach of FIG. 3.

The three-staged query is designed to determine whether a given previously rejected item of authored content was subsequently published and, if so, under what DOI.

Overview. Given the name, list of authors, and rejection date for the rejected item of authored content (402), the three-staged query takes the following general form:

Search against the database API, for example the Crossref API, and take the top 30 ranked results. For each result, in order:
1. Calculate a score for author similarity;
2. Calculate a score for title similarity;
3. Check scores against preset match conditions vectored by number of authors; and
4. Check scores against preset exceptional conditions.

This general form is repeated thrice, each time using a different type of search. The process stops as soon as one or more results is found that meets one of the preset conditions. In one embodiment, the process stops as soon as the first result is found that meets one of the preset conditions, given that results returned by the DOI database are presented in a priority order.

Searching database. A first step is to search a database, for example Crossref, using an API, for example the Crossref Search API. This may be done up to three times, sequentially, using a different type of search each time.

A. The first search (404) is a title-only open search that uses the rejected item of authored content name as a value for the query search parameter and filters by rejection date. This is a broad query that may match across many item of authored content fields, including title and abstract.

B. The second search (406) is a title-only field search that, again, uses the rejected item of authored content name and filters by rejection date, but this time matches the name explicitly against only the item of authored content title field via the query.title search parameter.

C. The third search (408) is a title-and-author field search that performs the same search as the title-only-field search but adds a comma-separated list of author surnames via the query.author search parameter. This is the most restrictive query.

Each search is set to return up to 30 ranked results (410).

Calculating an Author Match Score. A list of author last names is extracted from each search result and scored against a similar list of author last names from the given rejected item of authored content. In one embodiment, the Author Match Score (412) is the number of names from the rejected item of authored content for which there is an equivalent in the list of names from the search result as a ratio (between 0 and 1) of the total number of names in the rejected item of authored content. Two names are considered equivalent when the Levenshtein distance between them is less than 0.2.

Calculating a Title Match Score. An item of authored content title is extracted from each search result and scored against the title of the given rejected item of authored content. In one embodiment, the Title Match Score (414) is the Jaccard Similarity Coefficient (between 0 and 1) between context-aware noun lists from each title.

In one embodiment, to generate a context-aware noun list for a title, a title may be first tokenized and stripped of stop words. Each token may be stripped of case and punctuation and then lemmatized, wherein 'lemmatized' throughout this specification refers to a process of replacement with an equivalent reduced, uninflected token using complex, context-aware databases. Lemmas may be then filtered leaving only nouns.

Check against basic preset match conditions vectored by author count. A search result is considered a successful match if its Author Match Score and Title Match Score exceed associated basic thresholds (416), vectored by the number of authors in the rejected item of authored content. Basic thresholds may be predetermined by empirical techniques, including an exhaustive, manual analysis of the data which is informed by typical patterns of item of authored content authorship and title transformation for a given publisher, genre, field, or in general.

Throughout this specification, the term "vectoring by the number of authors" means that as the number of authors in the source item of authored content change, the minimum Author Match Score and/or minimum Title Match Score change: In one embodiment, if there is a single author in the source item of authored content, a minimum Author Match Score is 1.00 and a minimum Title Match Score is 0.50; if there are two authors in the source item of authored content, a minimum Author Match Score is 1.00 and a minimum Title Match Score is 0.20; if there are three authors in the source item of authored content, a minimum Author Match Score is 0.66 and a minimum Title Match Score is 0.20; if there are four authors in the source item of authored content, a minimum Author Match Score is 0.75 and a minimum Title Match Score is 0.20; and if there are five or more authors in the source item of authored content, a minimum Author Match Score is 0.70 and a minimum Title Match Score is 0.20. If no match is found against the basic preset match conditions, exceptional preset match conditions are tested.

Check against exceptional preset match conditions. A search result is considered a successful match if its Author Match Score and Title Match Score exceed associated exceptional thresholds (418).

Exceptional thresholds may check corner cases or other non-vectored match conditions. Examples of exception thresholds include a check for a 'fifty-fifty match' meaning a minimum Author Match Score of 0.50 with a minimum Title Match Score of 0.50; and/or a strong title match wherein a minimum Author Match Score of 0.10 is permitted with a minimum Title Match Score of 0.80. Exceptional thresholds may be predetermined by empirical techniques, including an exhaustive, manual analysis of the data which is informed by typical patterns of item of authored content authorship and title transformation for a given publisher, genre, field, or in general.

If no match is found against the exceptional preset match conditions, then the item of authored content may be considered unpublished.

Figure 5:
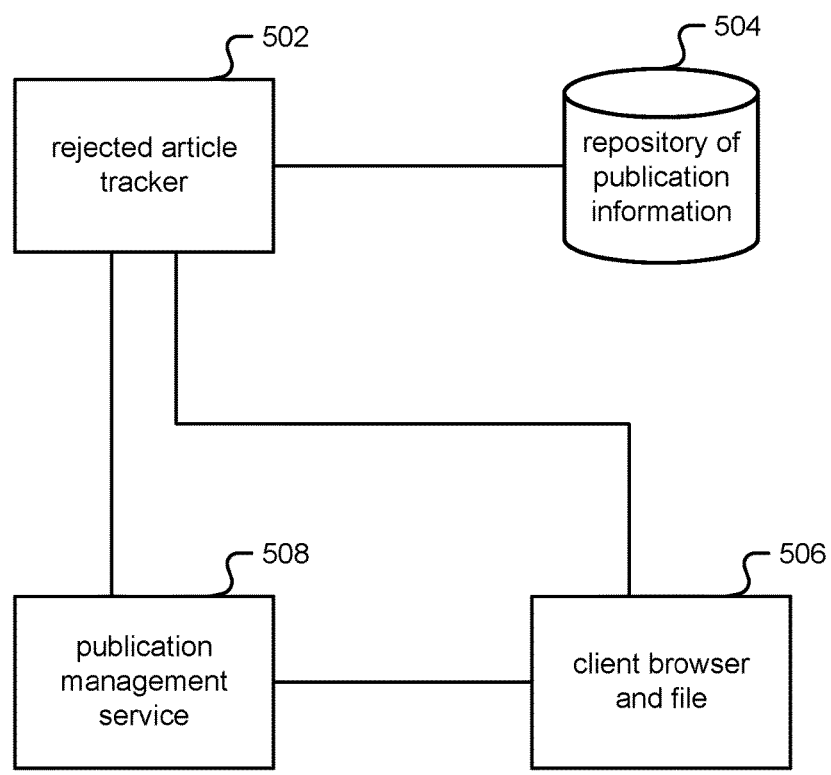
FIG. 5 is a block diagram illustrating an embodiment of a system for identifying a published version of an item of authored content.

FIG. 5 is a block diagram illustrating an embodiment of a system for identifying a published version of an item of authored content. In one embodiment, the system of FIG. 5 is associated with the techniques of FIGS. 3 and/or 4.

A rejected article tracker (502) is a server (100) configured to identify a published version of an item of authored content. In one embodiment, the rejected article tracker (502) includes a memory (110) configured to store metadata associated with a pre-publication draft of the item of authored content, the metadata including a draft title and a pre-publication set of one or more authors. In one embodiment, the rejected article tracker (502) includes a processor (102) coupled to the memory and configured to: determine that no result in a first set of search results received from a repository of publication information in response to a first query based on the draft title satisfies one or more match criteria to be considered a match to the pre-publication draft of the item of authored content; formulate and submit to the repository, in response to said determination, a second query based on the draft title; receive in response to the second query a second set of search results, each search result being associated with an associated published item of authored content, each published item of authored content having associated therewith a title as published and a list of authors as published; and apply to at least a subset of results included in the second set of search results the one or more match criteria to each of the title as published and the list of authors as published to determine a result considered to be a match to the pre-publication draft.

The rejected article tracker (502) is coupled to a repository of publication information (504). Without limitation, one example of the repository of publication information is a database associated with the Crossref DOI registration agency. The tracker (502) and database (504) may be coupled via API, for example the Crossref Search API.

The rejected article tracker (502) is also coupled to a client browser (506) from which to receive the instructions to start rejected article tracking and the metadata associated with the pre-publication draft of the item of authored content. The metadata may be a file at the client browser (506), or may be sourced from a publication management service (508) coupled to both the client browser (506) and the rejected article tracker (502). An example of the publication management service (508) is HighWire BenchPress. In one embodiment, the rejected article tracker (502) and publication management service (508) may physically and/or logically housed in the same server (100) or server rack.

Figure 6:
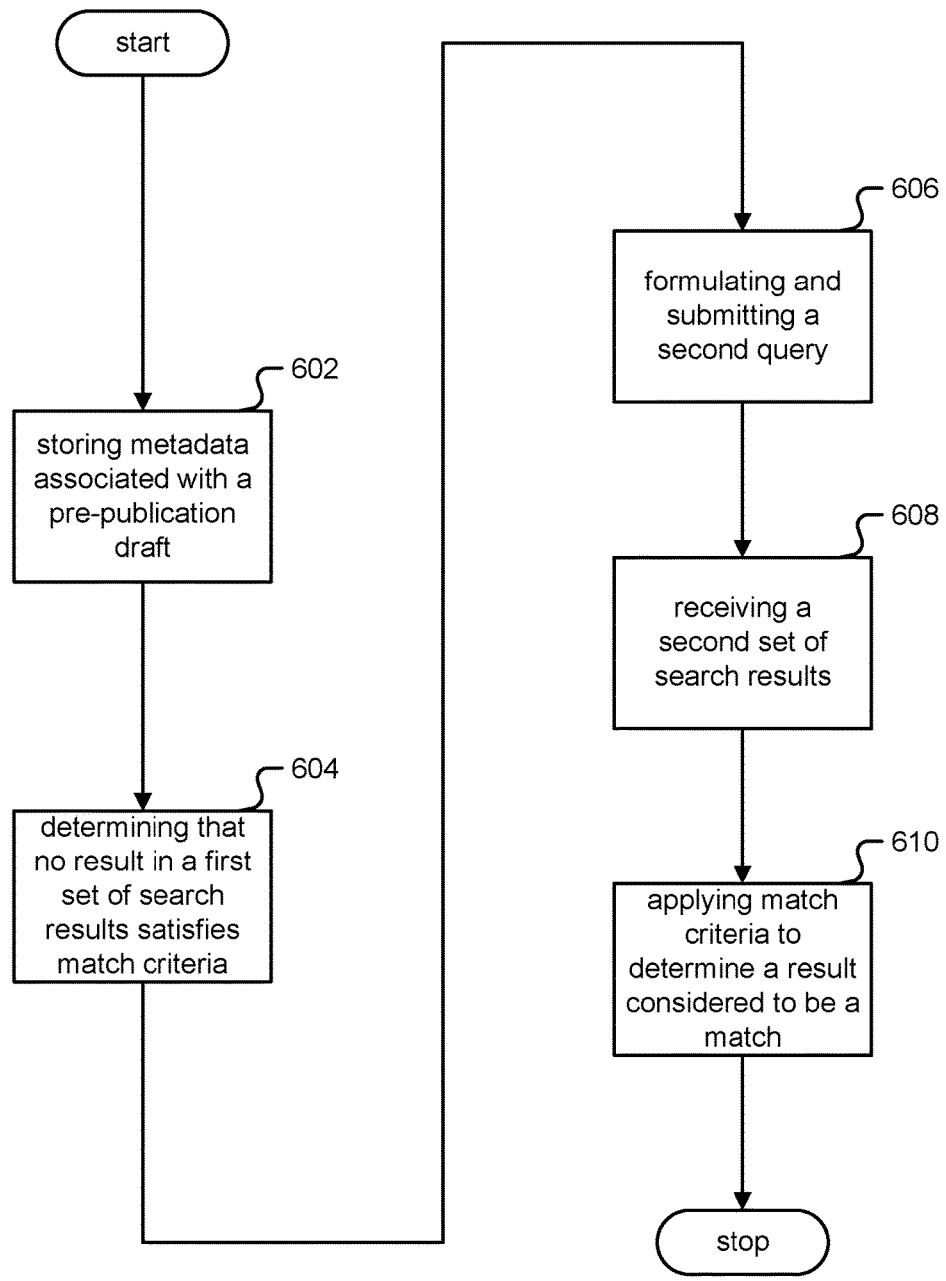
FIG. 6 is a flow chart illustrating an embodiment of a process for identifying a published version of an item of authored content.

FIG. 6 is a flow chart illustrating an embodiment of a process for identifying a published version of an item of authored content. In one embodiment, the process of FIG. 6 is carried out by rejected article tracker (502) in FIG. 5.

In step 602, metadata is stored, wherein the metadata is associated with a pre-publication draft of the item of authored content, the metadata including a draft title and a pre-publication set of one or more authors.

In step 604, it is determined that no result in a first set of search results received from a repository of publication information in response to a first query based on the draft title satisfies one or more match criteria to be considered a match to the pre-publication draft of the item of authored content. The first query may be an open query over all metadata, for example an open query based on the title of the pre-publication draft. The one or more match criteria may be based at least in part on an author match score and a title match score.

In step 606, a second query is formulated and submitted to the repository in response to said determination. The second query is based on the draft title. The second query may be a field query comprising a title field query based on the draft title. The second query may alternately be a field query comprising a title field query based on the draft title in conjunction with an author field query based on the pre-publication set of one or more authors.

In step 608, a second set of search results is received in response to the second query, each search result being associated with an associated published item of authored content, each published item of authored content having associated therewith a title as published and a list of authors as published.

In step 610, one or more match criteria is applied to at least a subset of results included in the second set of search results, to each of the title as published and the list of authors as published to determine a result considered to be a match to the pre-publication draft.

The author match score may be based at least in part on a fuzzy match, for example based at least in part on a Levenshtein distance. The threshold associated with the Levenshtein distance may be based at least in part on a target journal and a journal associated with a result in the subset of results, for example wherein the threshold is higher in the event that a field of study associated with the target journal is different from that of the journal associated with the result. In one embodiment, the second query comprises an author denoted as a first author and another author denoted as a last author. The title match score may be based at least in part on a context-aware match. In one embodiment, the context-aware match is based at least in part on a Jaccard index.

The one or more match criteria may be based at least in part on a count of the pre-publication set of one or more authors, such as a vectored preset match condition. A first match criteria based on a count of one author may be different from a second match criteria based on a count of five or more authors. An example of a first match criteria includes requiring a minimum author score of 1.00 and a minimum title score of 0.50, and a second match criteria includes requiring a minimum author score of 0.70 and a minimum title score of 0.20. In one embodiment, a specific search result is filtered or otherwise excluded from the second set of search results in the event the specific search result is not associated with a publisher.

The second query may also be based on an abstract. The abstract may be preprocessed by extracting stop words prior to formulation and submission of the second query, wherein stop words includes low-information grammatical word and auxiliary words. The title may be preprocessed by generating a context-aware noun list for the title, for example including one or more of the following steps: tokenizing the title; stripping the title of stop words; stripping a token of case; stripping a token of punctuation; lemmatizing a token, wherein lemmatization includes replacing a token with an equivalent reduced, uninflected token using a complex context-aware database; and filtering lemmas leaving only nouns.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to identify a published version of an item of authored content, comprising:
   a memory configured to store metadata associated with a pre-publication draft of the item of authored content, the metadata including a draft title and a pre-publication set of one or more authors; and
   a processor coupled to the memory and configured to:
   determine that no result in a first set of search results received from a repository of publication information in response to a first query based on the draft title satisfies one or more match criteria to be considered a match to the pre-publication draft of the item of authored content;
   formulate and submit to the repository, in response to said determination, a second query based on the draft title;
   receive in response to the second query a second set of search results, each search result being associated with an associated published item of authored content, each published item of authored content having associated therewith a title as published and a list of authors as published; and
   apply to at least a subset of results included in the second set of search results the one or more match criteria to each of the title as published and the list of authors as published to determine a result considered to be a match to the pre-publication draft.

2. The system of claim 1, wherein the first query is an open query over all metadata.

3. The system of claim 1, wherein the second query is a field query comprising a title field query based on the draft title.

4. The system of claim 1, wherein the second query is a field query comprising a title field query based on the draft title in conjunction with an author field query based on the pre-publication set of one or more authors.

5. The system of claim 1, wherein the one or more match criteria is based at least in part on an author match score and a title match score.

6. The system of claim 5, wherein the author match score is based at least in part on a fuzzy match.

7. The system of claim 6, wherein the fuzzy match is based at least in part on a Levenshtein distance.

8. The system of claim 7, wherein a threshold associated with the Levenshtein distance is based at least in part on a target journal and a journal associated with a result in the subset of results.

9. The system of claim 8, wherein the threshold is higher in the event that a field of study associated with the target journal is different from that of the journal associated with the result.

10. The system of claim 6, wherein the second query comprises an author denoted as a first author and another author denoted as a last author.

11. The system of claim 5, wherein the title match score is based at least in part on a context-aware match.

12. The system of claim 11, wherein the context-aware match is based at least in part on a Jaccard index.

13. The system of claim 5, wherein the one or more match criteria is based at least in part on a count of the pre-publication set of one or more authors.

14. The system of claim 13, wherein a first match criteria based on a count of one author is different from a second match criteria based on a count of five or more authors.

15. The system of claim 14, wherein the first match criteria includes requiring a minimum author score of 1.00 and a minimum title score of 0.50, and the second match criteria includes requiring a minimum author score of 0.70 and a minimum title score of 0.20.

16. The system of claim 1, further comprising filtering or otherwise excluding a specific search result of the second set of search results in the event the specific search result is not associated with an original publisher.

17. The system of claim 1, wherein the second query is also based on an abstract.

18. The system of claim 17, wherein the abstract is preprocessed by extracting stop words prior to formulation and submission of the second query, wherein stop words includes low-information grammatical word and auxiliary words.

19. The system of claim 1, wherein the title is preprocessed by generating a context-aware noun list for the title.

20. The system of claim 19, wherein generating the context-aware noun list for the title includes one or more of the following steps: tokenizing the title; stripping the title of stop words; stripping a token of case; stripping a token of punctuation; lemmatizing a token, wherein lemmatization includes replacing a token with an equivalent reduced, uninflected token using a complex context-aware database; and filtering lemmas leaving only nouns.

21. A method to identify a published version of an item of authored content, comprising:
   storing metadata associated with a pre-publication draft of the item of authored content, the metadata including a draft title and a pre-publication set of one or more authors;
   determining that no result in a first set of search results received from a repository of publication information in response to a first query based on the draft title satisfies one or more match criteria to be considered a match to the pre-publication draft of the item of authored content;
   formulating and submitting to the repository, in response to said determination, a second query based on the draft title and the pre-publication set of one or more authors;
   receiving in response to the second query a second set of search results, each search result being associated with an associated published item of authored content, each published item of authored content having associated therewith a title as published and a list of authors as published; and
   applying to at least a subset of results included in the second set of search results the one or more match criteria to each of the title as published and the list of authors as published to determine a result considered to be a match to the pre-publication draft.

22. A computer program product for identifying a published version of an item of authored content, the computer program product being embodied in a non-transitory computer-readable medium and comprising computer instructions for:
   storing metadata associated with a pre-publication draft of the item of authored content, the metadata including a draft title and a pre-publication set of one or more authors;
   determining that no result in a first set of search results received from a repository of publication information in response to a first query based on the draft title satisfies one or more match criteria to be considered a match to the pre-publication draft of the item of authored content;
   formulating and submitting to the repository, in response to said determination, a second query based on the draft title and the pre-publication set of one or more authors;
   receiving in response to the second query a second set of search results, each search result being associated with an associated published item of authored content, each published item of authored content having associated therewith a title as published and a list of authors as published; and
   applying to at least a subset of results included in the second set of search results the one or more match criteria to each of the title as published and the list of authors as published to determine a result considered to be a match to the pre-publication draft.

* * * * *